United States Patent [19]

Coffey

[11] Patent Number: 4,915,970

[45] Date of Patent: Apr. 10, 1990

[54] METHOD OF THICKENING FOOD PRODUCTS BY MIXTURES OF STARCH AND METHYLCELLULOSE ETHERS AS HIGH TEMPERATURE THICKENERS

[75] Inventor: Donald G. Coffey, Midland, Mich.

[73] Assignee: The Dow Chemical Company, Midland, Mich.

[21] Appl. No.: 255,563

[22] Filed: Oct. 11, 1988

Related U.S. Application Data

[63] Continuation-in-part of Ser. No. 24,450, Mar. 11, 1987, abandoned.

[51] Int. Cl.$^4$ .......................... A23L 1/195; A23L 1/04
[52] U.S. Cl. ...................... 426/573; 426/578; 426/658; 426/661
[58] Field of Search ............... 426/578, 579, 589, 654, 426/658, 573

[56] References Cited

U.S. PATENT DOCUMENTS

| | | | |
|---|---|---|---|
| 3,215,531 | 11/1965 | Rivoche | 426/578 |
| 3,399,062 | 8/1968 | Willard, Jr. et al. | |
| 3,619,208 | 11/1971 | Bahoshey et al. | 426/579 |
| 3,857,976 | 12/1974 | Szymanski et al. | |
| 3,899,602 | 8/1975 | Retenberg et al. | 426/378 |
| 3,904,601 | 9/1975 | Tessler | 426/578 |
| 3,969,340 | 7/1976 | Tessler et al. | 426/579 |
| 3,970,767 | 3/1976 | Tessler et al. | 426/579 |
| 4,192,900 | 3/1980 | Cheng | 426/579 |
| 4,415,599 | 11/1983 | Bos | 426/579 |
| 4,568,555 | 2/1986 | Spanier | |
| 4,597,974 | 7/1986 | Fonteneau et al. | |
| 4,623,552 | 11/1986 | Rapp | 426/579 |

*Primary Examiner*—Jeanette Hunter

[57] ABSTRACT

A method of thickening a food product which substantially maintains the viscosity of food products when they are heated to elevated temperatures. The method comprises using specific methylcelluloses in combination with various food approved starches.

16 Claims, No Drawings

METHOD OF THICKENING FOOD PRODUCTS BY MIXTURES OF STARCH AND METHYLCELLULOSE ETHERS AS HIGH TEMPERATURE THICKENERS

CROSS-REFERENCE TO RELATED APPLICATION

This is a continuation-in-part of copending U.S. application Ser. No. 024,450, filed Mar. 11, 1987.

FIELD OF THE INVENTION

This invention relates to a method of thickening food compositions. Typically, the food products are thickened by the addition of starch. The improvement of this invention comprises the incorporation of methylcellulose into the starch and food product.

BACKGROUND OF THE INVENTION

Many food products are fluids that have historically been thickened with starches. Some examples of foods in this group include gravies, sauces, stews, cream soups, pie fillings, puddings, and the like. A number of these products are intended to be served at high temperatures. A problem that exists in traditional starch thickened fluid foods is a loss of viscosity upon heating and holding at the high serving temperatures. This loss of viscosity upon heating poses problems for food manufacturers because viscosity is one of the most important sensory attributes of these food products The products must have a fairly high viscosity at serving temperatures in order to receive consumer acceptance.

Similar to starch thickened systems, foods thickened with food approved gums lose viscosity when heated to and held at elevated temperatures. Food products which are designed with gums to yield adequate viscosity at high temperatures suffer from several drawbacks. First, food products which exhibit adequate high-temperature viscosity generally exhibit undesirably high low-temperature viscosities. Secondly, such food products generally exhibit undesirable sensory characteristics such as gumminess, thickness, and ropiness.

Attempts have been made to try to obtain a starch based thickening composition which would impart the desirable viscosity properties to food products at elevated serving temperatures. U.S Pat. No. 4,597,974 discloses a mixture of rice starch and carob-bean flour as the components of a food product thickener, the reference does not disclose the use of any cellulose derivatives.

U.S. Pat. Nos. 3,969,340 and 3,970,767 disclose certain blends of starch and amylose starches which have been hydroxypropylated and inhibited to a specific degree in order to impart specific viscosity properties to the starches. The blends are disclosed as being able to impart thickening properties to food products prepared under retort conditions.

In order to overcome the deficiency of starch thickened systems, manufacturers have found it necessary to add high levels of starch to the food products. This causes the problem of excessive viscosity at the low temperatures at which many of the food products are processed and packaged. Food manufacturers and the consumer would both benefit from food products that exhibit less of a viscosity loss or even a viscosity increase on heating. Manufacturers could gain processing efficiencies and consumers could have access to foods which show a stable viscosity response to serving temperatures.

SUMMARY OF THE INVENTION

The present invention relates to a method of thickening a food product. Typically, food products are thickened by the addition of starch. The improvement of this invention comprises the incorporation of methylcellulose into the starch and food product. The starch and methylcellulose are blended in a ratio and used in an amount effective to maintain the viscosity of the thickened food product at an elevated temperature at a value substantially equal to or greater than the viscosity of the thickened food product prior to the food product being heated to the elevated temperature.

More specifically in a method of thickening food compositions, wherein the food product is thickened by the addition of starch to the food product, the improvement comprises:

(a) incorporating methylcellulose into the starch and food product, wherein the ratio of the starch to methylcellulose is such that when the starch and methylcellulose are used in amounts up to about 5 percent by weight of a total food product, the viscosity at an elevated temperature is substantially equal to or greater than the viscosity of the thickened food product prior to its being heated to the elevated temperature:

(b) heating said mixture at a temperature and for a time period to effectively gelatinize said starch to form a homogeneous mixture; and (c) cooling said mixture.

The thickened composition of the present invention exhibits the unexpected characteristic of maintaining or increasing the viscosity of a solution when heat is applied to the solution, unlike starch alone which tends to show a loss of thickening properties when subjected to extended periods of elevated temperatures. By a careful choice of the methylcellulose used in the composition, thickened systems may be designed which maintain or increase the viscosity of food products at elevated temperatures. Food processors could take advantage of this to design food products that exhibit fairly stable or increasing viscosity value during heating which would be more appealing and more palatable to consumers. Consumers would also benefit from foods that were easier to prepare and more palatable over a wider range of temperatures.

The present invention provides such a means to provide food products which have been designed to yield stable or increasing viscosities during heating. This will allow manufacturers to design food products which exhibit desirable rheological characteristics at specific temperatures without compromising the rheology at lower or higher temperatures.

DETAILED DESCRIPTION OF THE INVENTION

Those food products which may be thickened by the present invention include any edible food product which is desirable to consumers to maintain thickening properties upon heating of the food product. Examples of such food products include soups, sauces, cheese spreads, batters, dressings and the like. The food products which are useful in the present invention must be compatible with starch based and cellulose ether based thickening compositions. Typically food products could also include flavorings, spices and the like.

By the term "food product" as used herein is meant an edible food composition which has not been contacted with the thickening composition of the present invention. By the term "thickened food product" is meant any food product which has been contacted with the thickening composition of the present invention.

The starches used in the present invention are those varieties which are known as food approved starches. Such food approved starches include unmodified and modified glucose polymers of vegetable origin. Examples of suitable food starches include corn, wheat, sorghum, rice, casaba, potato, arrowroot, sago palm and mixtures thereof. Preferably, a corn starch is used in the present invention. Of the preferred corn starches, the most preferred include those crosslinked or substituted by any method accepted by the U.S. Food and Drug Administration in its regulations published in 21 CFR §172.892 which is incorporated herein by reference. Such food starches typically impart a thickening characteristic to the food products to which they are added.

The starch used in the present invention can be any of the above-mentioned food starches in either its native or modified form. Native starches are produced by extraction from: the seeds of such plants as corn, wheat, sorghum or rice; the tuber, or roots, of plants like casaba, potato or arrowroot; and the pith of the sago palm. The starch can be either pre-gelatinized or non-gelatinized. If the starch is non-gelatinized, the preparation process of the invention must have a heating step which must be sufficient to effect gelatinization during the preparation of the thickening composition.

Exemplary food starches include those available as Thin-n-Thik ™ 99, Sta-Mist ™ 365, Kol Guard ™, and Mira-Thik ™, available from A. E. Staley Company, Decatur, Illinois.

The amount of starch which is used in formulating the present thickening composition is that amount which is effective to impart the desired thickening properties to the food product to be thickened. The starch is desirably used in an amount which results in a thickened food product which exhibits a viscosity of at least about 100 percent of the viscosity of the thickened food product prior to being heated to the elevated temperature. More preferably, the starch is used in an amount which results in a thickened food product which exhibits a viscosity of at least about 125 percent, most preferably 150 percent, of the viscosity of the thickened food product prior to being heated to the elevated temperature. This amount may range from about 3 percent to about 7 percent of the total weight of the food product to be thickened. Preferably, the amount of starch used ranges from about 4 percent to about 6 percent of the total weight of the food product to be thickened.

Methylcellulose ethers are a class of cellulose ethers which have long been used in many industries as viscosity control agents, emulsifiers, and binding agents. The cellulose ethers are unique in that, at concentrations of 2 percent or more in water, they undergo thermal gelation. In essence, as the temperature of the solution of cellulose ethers increases, the polymer chains dehydrate to some extent and crosslink, forming a gel network. The gel formation is reversible upon the cooling of the solution of cellulose ether. At lower levels of concentration it is observed that the cellulose ethers respond like other hydrophilic materials in that the viscosity of the solution decreases with increasing temperature. In the practice of the present invention a particular cellulose ether is found to exhibit unexpected thickening properties when combined with starch to form a thickening composition. The particular methylcellulose ethers of the present invention help a solution to unexpectedly maintain or increase the viscosity of the solution upon heating when compared to the performance of other thickening compositions, particularly those using other types of cellulose ethers.

The methylcellulose used in the present invention may be prepared by any of a number of known methods. Generally, methylcellulose is prepared by the formation of an alkali cellulose by the addition of sodium hydroxide to a slurry of cellulose floc in a diluent. The alkali cellulose is then reacted with an alkyl halide, such as methyl chloride, under pressure. Thereafter, the slurry is neutralized and the product is extracted, dried and ground.

The methylcellulose ethers which are useful in the present invention are those which when combined in particular amounts and ratios with various starches impart a thickening property to food products which is maintained even at elevated temperatures. The amounts, ratios, and degree of thickening properties imparted to the food products by the thickening composition of the present invention are delineated in subsequent paragraphs.

The particular methylcellulose ethers which are useful in the present invention include those which, when in a 2 percent aqueous solution, exhibit a viscosity at 20° C. ranging from about 3 cps to about 3,500 cps. Preferably, the 2 percent aqueous solution at 20° C. exhibits a viscosity ranging from about 10 cps to about 1,000 cps and most preferably from about 15 cps to about 500 cps. Such viscosities are measured by conventional methods using Ubbelohde capillary tubes.

The molecular weights of such methylcellulose ethers range from about 10,000 to about 1,000,000, more preferably from about 50,000 to about 500,000 and most preferably from about 80,000 to about 400,000.

Examples of methylcellulose ethers include those commercially available as METHOCEL ™, available from The Dow Chemical Company, Metolose ™ and Pharmacoat ™, available from the Shinetsu Chemical Company, Tokyo, Japan.

The amount of methylcellulose ether used in the present thickening composition is such that the viscosity of the thickened food product will be substantially maintained or increased when the food product is heated from a temperature ranging from about 15° C. to about 25° C. to an elevated temperature ranging from about 65° C. to about 100° C. By "substantially maintained" is meant that the viscosity of the food product containing the present thickening composition, after heating to an elevated temperature, will be at least 100 percent of the viscosity of the thickened food product prior to heating to the elevated temperature. Preferably, the thickened food product at the elevated temperature exhibits a viscosity which is at least 125 percent of the viscosity of the thickened food and most preferably 150 percent of the viscosity of the thickened food product prior to heating to the elevated temperature.

Preferably, the methylcellulose ether is used in amounts ranging from about 0.25 percent to about 1.5 percent based on the total weight of the food product. Most preferably, the methylcellulose ether is used in amounts ranging from about 0.5 percent to about 1.0 percent based on the total weight of the food product to be thickened.

The starch and methylcellulose comprising the thickening composition are used in total amounts ranging up to about 5 percent of the total weight of the food product to be thickened. The ratio of starch to methylcellulose ether is such that, when used in amounts up to about 5 percent by weight of the food product, the viscosity of the thickened food product at the elevated temperature is at least 200 percent of the viscosity of the food product prior to being thickened and heated to the elevated temperature. Preferably, the ratio is such that the viscosity of the thickened food product at the elevated temperature is at least 400 percent of the viscosity of the food product prior to thickening and heating. Most preferably, the ratio is such that the viscosity of the thickened food product at the elevated temperature is at least 600 percent of the viscosity of the food product prior to thickening and heating. Ratios of starch to methylcellulose ethers which will give the desired viscosity characteristics range from about 2:1 to about 28:1, preferably about 4:1 to about 12:1. Typically, the ratio is employed in as much as about 5 weight percent of the food product.

The thickened food products at the elevated temperature exhibit a viscosity ranging from about 2,000 cps to about 25,000 cps. More preferably, the viscosity of the thickened food product at the elevated temperature ranges from about 3,000 cps to about 18,000 cps and most preferably, from about 4,000 cps to about 13,000 cps.

The particular thickening compositions of the present invention may be formulated by incorporating methylcellulose into the starch and a food product, preferably in water to form a mixture. The mixture is heated to a temperature and for a time period to effectively gelatize said granules. Note, if pregelatinized starch granules are used, then the heating step is not necessary. There are several ways in which the methylcellulose can be incorporated into the food product and starch. The starch and food product can be mixed in water and then the methylcellulose is added. Another option is to admix the methylcellulose and food product together and then add the mixture to the starch and water. Alternatively, the starch and methylcellulose are admixed and then the food product is added, or all three components can be admixed together at the same time.

The mixture is heated to a temperature of at least 40° C., preferably, from about 40° C. to about 95° C. Generally, the mixture is heated until the starch gelatinizes. Preferably, the starch is heated for about 10 to about 30 minutes. The mixture is cooled to an edible temperature. The resulting mixture has a high viscosity which is maintained upon subsequent heating.

It is desirable that the composition be as homogeneously mixed as possible to insure a uniform dispersion of the starch and methylcellulose in the food product to be thickened. This may be accomplished by the thorough mixing of the composition after the addition of the thickening components.

The following comparative examples are included for purposes of comparison and are not intended as an illustration of the present invention.

COMPARATIVE EXAMPLE I

For the purpose of comparison only, a sample of a thickening composition based on starch only was prepared by the following procedure and tested for its ability to impart high temperature viscosity properties to a solution.

5 Grams of a 3:1 ratio of Thin-n-Thik ™ 99 and Sta-Mist ™ 365 modified starch is dispersed in 95 g of water at 20° C. in a 1-liter beaker. The starch is dispersed by stirring. The dispersion is then heated to 95° C. for a period of time sufficient to insure the gelatinization of the starch granules, about ten minutes. The solution is then allowed to cool to room temperature (20° C.). The solution is then placed in a sealed jar and allowed to stand overnight at room temperature in order to allow the solution to come to a viscosity equilibrium. The viscosity of the solution is then measured by rotational viscometry using a Brookfield RVT Rotational Viscometer set at 2.5 rpm and using a No. 3 spindle. The data is reported under Example C-1 in Table I. The jar of solution is then immersed in a water bath set at 40° C. and allowed to equilibrate at the water bath temperature for a period of 3 hours. The viscosity of the solution is then measured in the same manner as discussed above with regard to the solution at room temperature. The data is reported under Example C-1 in Table I. The viscosity of the solution is measured in a similar manner for solutions which have been immersed in water baths set at 60°, 80° and 95° C. The results are reported under Example C-1 in Table 1.

In a similar manner, the procedure of Comparative Example 1 is repeated except that, instead of 5 g of modified starch, 3.9 g of Kol Guard ™ starch is used. The viscosity of the solution in measured in the same manner and the results are reported in Table I under Example C-1A.

The data illustrate that thickening systems based on starch alone are not able to maintain the viscosity of the thickened system at elevated temperatures.

COMPARATIVE EXAMPLE 2

For the purpose of comparison only, a sample of a thickening composition based on methylcellulose which, when in a 2 percent aqueous solution, exhibits a viscosity of 4,000 cps at 20° C. was prepared by the following procedure and tested for its ability to impart high temperature viscosity properties to a solution.

2.25 Grams of the above described methylcellulose is dispersed in 97.75 g of water at 95° C. in a 1-liter beaker. The methylcellulose is dispersed by stirring. The solution is then allowed to cool to room temperature (20° C.). The solution is then placed in a sealed jar and allowed to stand overnight at room temperature in order to allow the solution to come to a viscosity equilibrium. The viscosity of the solution is then measured by rotational viscometry using a Brookfield RVT Rotational Viscometer set at 5 rpm and using a No. 4 spindle. The data is reported under Example C-2 in Table I. The jar of solution is then immersed in a water bath set at 40° C. and allowed to equilibrate at the water bath temperature for a period of 3 hours. The viscosity of the solution is then measured in the same manner as discussed above with regard to the solution at room temperature. The data is reported under Example C-2 in Table I. The viscosity of the solution is measured in a similar manner for solutions which have been immersed in water baths set at 60°, 80° and 95° C. The results are reported under Example C-2 in Table I.

In a similar manner, the procedure of Comparative Example 2 is repeated except that 2.25 g of a hydroxypropyl methylcellulose which, when in a 2 percent aqueous solution exhibits a viscosity of 4,000 cps at 20° C. The viscosity of the solution is measured in a similar manner and the results are 20 reported in Table I under Example C-2A.

The data illustrate that, when methylcellulose or hydroxypropyl methylcellulose are used alone as thickening compositions, neither is able to maintain a desirable viscosity at the elevated temperatures.

COMPARATIVE EXAMPLE 3

For the purposes of comparison only, a sample of a thickening composition based on starch and other cellulose ethers other than methylcellulose were prepared by the following procedure and tested for their ability to impart high-temperature viscosity properties to a solution.

4 25 Grams of a 3:1 ratio of Thin-n-Thik TM 99 and Sta-Mist TM 365 modified starch is dispersed in 94.75 g of water at 20° C. in a 1-liter beaker. The starch is dispersed by stirring. The dispersion is then heated to 95° C. for a period of time sufficient to insure the gelatinization of the starch granules, about 10 minutes. To the hot solution is then added 1 g of a hydroxypropyl methylcellulose ether which, when in a 2 percent aqueous solution, exhibits a viscosity of 4,000 cps at 20° C., with stirring. The stirred solution is then allowed to cool to room temperature (20° C.). The solution is then placed in a sealed jar and allowed to stand overnight at room temperature in order to allow the solution to come to a viscosity equilibrium. The viscosity of the solution is then measured by rotational viscometry using a Brookfield RVT Rotational Viscometer set at 2.5 rpm and using a No. 3 spindle. The data is reported under Example C-3 in Table I. The jar of solution is then immersed in a water bath set at 40° C. and allowed to equilibrate at the water bath temperature for a period of 3 hours. The viscosity of the solution is then measured in the same manner as discussed above with regard to the solution at room temperature. The data is reported under Example C-3 in Table I. The viscosity of the solution is measured in a similar manner for solutions which have been immersed in water baths set at 60°, 80° and 95° C. The results are reported under Example C-3 in Table I.

A similar run is done using a hydroxypropyl methylcellulose ether as the second component in the thickening composition. This particular cellulose ether, when in a 2 percent aqueous solution, exhibits a viscosity of about 100,000 cps at a temperature of 20° C. The comparative run is measured for viscosity by the same method as discussed above. The results are reported under Example C-4 in Table I.

A similar run is done using a methylcellulose ether as the second component in the thickening composition. This particular cellulose ether, when in a 2 percent aqueous solution, exhibits a viscosity of about 4,000 cps at a temperature of 20° C. The comparative run is measured for viscosity by the same method as discussed above. The results are reported under Example C-5 in Table I.

A similar run is done using a methylcellulose ether as the second component in the thickening composition. This particular cellulose ether, when in a 2 percent aqueous solution, exhibits a viscosity of about 1,500 cps at a temperature of 20° C. The comparative run is measured for viscosity by the same method as discussed above. The results are reported under Example C-6 in Table I.

The data illustrate that certain cellulose ethers when combined with starch to form a thickening composition do not exhibit the desirable high temperature viscosity control that the present invention does.

The following examples are intended to illustrate the present invention and are not intended to limit the scope in anyway.

EXAMPLE 1

4.25 Grams of a 3:1 ratio of Thin-n-Thik TM 99 and Sta-Mist TM 365 modified starch is dispersed in 94.75 g of water at 20° C. in a 1 liter beaker. The starch is dispersed by stirring. The dispersion is then heated to 95° C. for a period of time sufficient to insure the gelatinization of the starch granules, about 10 minutes. To the hot starch solution is added with stirring 1.0 g of methylcellulose which, when in a 2 percent aqueous solution, exhibits a viscosity of 15 cps at 20° C. The solution is stirred for 10 minutes. Stirring is continued and the solution is allowed to cool to room temperature (20° C.). The solution is then placed in a sealed jar and allowed to stand overnight at room temperature in order to allow the solution to come to a viscosity equilibrium. The solution is then measured for viscosity by rotational viscometry using a Brookfield RVT Rotational Viscometer set at 2.5 rpm and using a No. 3 spindle. The data is reported under Example 1 in Table I. The jar of solution is then immersed in a water bath set at 40° C. and allowed to equilibrate at the water bath temperature for a period of 3 hours. The viscosity of the solution is then measured in the same manner as discussed above with regard to the solution at room temperature. The data is reported under Example 1 in Table I. The viscosity of the solution is measured in a similar manner for solutions which have been immersed in water baths set at 60°, 80° and 95° C.

The results are reported in Table I under Example 1.

The procedure is repeated except that 2.9 g of Kol Guard TM starch is used instead of the 4.25 g of modified starch. The viscosities of the solution are measured in the same manner and the results are reported in Table I under Example 1A.

EXAMPLE 2

4.25 grams of a 3:1 ratio of Thin-n-Thik TM 99 and Sta-Mist TM 365 modified starch is dispersed in 94.75 g of water at 20° C. in a 1-liter beaker. The starch is dispersed by stirring. The dispersion is then heated to 95° C. for a period of time sufficient to insure the gelatinization of the starch granules, about 10 minutes. To the hot starch solution is added with stirring 1.0 g of methylcellulose which, when in a 2 percent aqueous solution, exhibits a viscosity of 400 cps at 20° C. The solution is stirred for 10 minutes. Stirring is continued and the solution is allowed to cool to room temperature (20° C.). The solution is then placed in a sealed jar and allowed to stand overnight at room temperature in order to allow the solution to come to a viscosity equilibrium. The solution is then measured for viscosity by rotational viscometry using a Brookfield RVT Rotational Viscometer set at 2.5 rpm and using a No. 3 spindle. The data is reported under Example 2 in Table I. The jar of solution is then immersed in a water bath set at 40° C. and allowed to equilibrate at the water bath temperature for a period of 3 hours. The viscosity of the solution is then measured in the same manner as discussed above with regard to the solution at room temperature. The data is reported under Example 2 in Table I. The viscosity of the solution is measured in a similar manner for solutions which have been immersed in water baths set at 60°, 80° and 95° C.

The results are reported in Table I under Example 2.

The procedure is repeated except that 2.9 g of Kol Guard ™ starch is used instead of the 4.25 g of modified starch. The viscosity of the solution is measured in the same manner and the results are reported in Table I under Example 2A.

TABLE I

Viscosity (cps) of Solution as a Function of Temperature (°C.)

| Example | Temperature | | | | |
|---|---|---|---|---|---|
| | 20 | 40 | 60 | 80 | 95 |
| C-1* | 6,400 | 5,360 | 3,187 | 1,947 | 1,733 |
| C-1A* | 9,360 | 10,040 | 7,960 | 7,520 | 7,160 |
| C-2* | 5,520 | gel | gel | gel | gel |
| C-2A* | 4,760 | 1,120 | 1,000 | 800 | gel |
| C-3* | 15,120 | 9,460 | 5,700 | 3,500 | 3,420 |
| C-4* | 163,300 | 72,900 | 18,480 | 7,280 | 7,020 |
| C-5* | 17,213 | 20,360 | 8,653 | 4,920 | 15,200 |
| C-6* | 16,120 | 17,900 | 16,200 | 8,340 | 6,220 |
| 1 | 2,120 | 4,270 | 15,100 | 13,680 | 12,960 |
| 1A | 360 | 360 | 12,700 | 17,690 | 19,600 |
| 2 | 7,573 | 8,387 | 11,053 | 7,293 | 17,080 |
| 2A | 2,740 | 3,280 | 14,840 | 13,540 | 13,200 |

*Not an example of the present invention.

The data in Table I indicate that the present invention imparts viscosity control over a wide range of temperatures and does not lose its thickening capability at elevated temperatures.

What is claimed is:

1. In a method of thickening water based food compositions, wherein the food product is thickened by the addition of starch to the food product, the improvement which comprises:
   (a) incorporating methylcellulose into the starch and food product to make a modified food product, wherein the methylcellulose has a molecular weight sufficient to yield a viscosity ranging from about 10 cps to about 1,000 cps in a 2 percent aqueous solution at 20° C., and wherein the starch and methylcellulose are used in a combined total amount of up to about 5 percent by weight of the modified food product, and wherein the methylcellulose is present in an amount effective to render the viscosity of the modified food product after step (b) substantially equal to or greater than the viscosity of the modified food product at an ambient temperature, prior to its being heated to an elevated temperature in step (b); and
   (b) heating said modified food product to an elevated temperature effective to achieve the desired thickening of the modified food product and for a time period and conditions to effectively form a homogeneous mixture having a viscosity of from about 2,000 to about 25,000 centipoise at the elevated temperature.

2. The method of claim 1, wherein the starch is a food approved starch comprising an unmodified or modified glucose polymer of vegetable origin.

3. The method of claim 1 wherein the starch is selected from the group consisting of unmodified, unsubstituted corn starch; instantized, unsubstituted 4. The method of claim 1 wherein the methylcellulose has a molecular weight sufficient to yield a viscosity ranging from about 15 cps to about 500 cps in a 2 percent aqueous solution at 20° C.

5. The method of claim 1 wherein the methylcellulose has a molecular weight ranging from about 10,000 to about 1,000,000.

6. The method of claim 1 wherein the viscosity of the modified food product at the elevated temperature is at least about 600 percent of the viscosity of the food product at an ambient temperature.

7. The method of claim 1 wherein the viscosity of the modified food product at the elevated temperature ranges from about 4,000 cps to about 13,000 cps.

8. The method of claim 7 wherein the modified food product at the elevated temperature exhibits a viscosity of at least about 200 percent of the viscosity of the food product at an ambient temperature.

9. The method of claim 1 wherein the elevated temperature is at least about 40° C.

10. The method of claim 1 wherein the elevated temperature ranges from about 40° C. to about 95° C.

11. The method of claim 1 wherein the ratio of starch to methylcellulose ranges from about 2:1 to about 28:1.

12. The method of claim 1 wherein the ratio of starch to methylcellulose ranges from about 4:1 to about 12:1.

13. The method of claim 1 wherein the starch is used in an amount ranging from about 3 percent to about 7 percent of the food product weight.

14. The method of claim 1 wherein the starch is used in an amount ranging from about 4 percent to about 6 percent of the food product weight.

15. The method of claim 1 wherein the methylcellulose is used in an amount ranging from about 0.25 percent to about 1.5 percent of the food product weight.

16. The method of claim 1 wherein the methylcellulose is used in an amount ranging from about 0.5 percent to about 1.0 percent of the food product weight.

* * * * *